United States Patent [19]

Page

[11] Patent Number: 4,480,323
[45] Date of Patent: Oct. 30, 1984

[54] REMOTE SELF-CONTAINED UNDERSEA MONITOR

[75] Inventor: Robert E. Page, San Diego, Calif.

[73] Assignee: The United States of America as represented by the Secretary of the Navy, Washington, D.C.

[21] Appl. No.: 386,127

[22] Filed: Jun. 7, 1982

[51] Int. Cl.³ .............................................. H04B 11/00
[52] U.S. Cl. ................................. 367/131; 73/170 A; 367/133
[58] Field of Search .............. 367/131, 133; 73/170 A

[56] References Cited

U.S. PATENT DOCUMENTS

| | | | |
|---|---|---|---|
| 3,039,077 | 6/1962 | Lasky et al. | 367/173 |
| 3,277,429 | 10/1966 | Hammond | 367/133 |
| 3,638,174 | 1/1972 | Haase et al. | 367/133 |
| 3,790,925 | 2/1974 | Ahrens | 367/113 |
| 3,818,425 | 6/1974 | Peynaud et al. | 367/173 |
| 3,820,391 | 6/1974 | Baker, Jr. et al. | 73/170 A |
| 3,935,592 | 1/1976 | Dahlen et al. | 73/170 A |
| 3,939,465 | 2/1976 | Helton et al. | 367/133 |
| 3,990,035 | 11/1976 | Byers | 367/141 |

OTHER PUBLICATIONS

Osborne et al., *Oceans '81 Conference Record*, Sep. 1981, pp. 512–516.

Primary Examiner—Richard A. Farley
Attorney, Agent, or Firm—Robert F. Beers; Ervin F. Johnston; Edmund W. Rusche, Jr.

[57] ABSTRACT

A remote oceanographic data recording system which is self-contained battery operated and removably attachable to an external surface of a submerged hull without a need to penetrate said hull is presented. The system is capable of gathering and recording oceanographic data and may be joined to the hull of a submarine without interfering in submarine operation in any way. The system receives analog ac and dc electrical input signals from a variety of oceanographic data sensors and converts the signals to digital data signals for recording on magnetic tape cassette. The housing for the system is watertight and capable of withstanding external hydrostatic pressures up to 1620 psi.

17 Claims, 4 Drawing Figures

SECTION A-A

REMOTE SELF-CONTAINED UNDERSEA MONITOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The use of submarines as platforms for gathering oceanographic data and other information has become of great importance to the U.S. Navy. It is useful and important to gather and record acoustic and oceanographic data in an underwater environment by mounting such sensors on the outside of the pressure hull of a submarine. In the past, operation of such sensors has often required that electric cables be passed through the pressure hull of the submarine, both to provide power for the sensor apparatus and also to provide a path into the submarine for receiving the detected data. However, it is very important to minimize the penetrations which must be made to the pressure hull of a submarine, since such penetrations can substantially weaken the hull, particularly if it is operating at extended depths.

Therefore, a need has existed for the development of a data gathering system which is attached to a submarine hull without the requirement of penetrations of that hull. The invention presented here is designed to provide a system which is capable of gathering and recording data, which may be joined to the hull of a submarine without interfering in submarine operation in any way, and which does not require the use of any cables which penetrate through the submarine hull.

SUMMARY OF THE INVENTION

The invention includes an underwater data recording system suitably contained in a housing which is attached to the surface of a submerged hull without the requirement of penetrating the hull for any purpose. The data recording system is designed for remote oceanographic or acoustic data recording, is self-contained, and is battery operated within the housing attaching it to the submerged hull.

The housing containing the data system is watertight and capable of withstanding hydrostatic pressures equivalent to the operating depths of interest. It is attached to the hull in a removable manner by such means as washers and nuts fastened through brackets fixed on the housing to threaded studs which have been welded to the surface of the submersible hull. The housing is fitted with a sealable access port in order that installation or removal of recording tapes, batteries or circuit components may be made. In addition, a watertight and sealable access port exists for allowing passage into the housing of cables from oceanographic and acoustic data sensors.

The data recording system receives through signal input ports analog ac and dc electrical signals from a variety of data sensors. These signals are fed to a signal conditioning unit which digitizes, multiplexes and transmits the signals through a control unit to be recorded by a magnetic tape recorder.

The control unit is a microprocessor computer which controls the operation of the signal conditioner and the operation of the recorder receiving the data to be recorded. Through this control unit and its direct memory access capability, the time and power requirements for recording the data is speeded up considerably over the time of receiving and conditioning the data samples from the oceanographic sensors. This results in conservation of power, thereby prolonging the total time available for operation of the unit.

The entire system is energized by a battery powered unit capable of providing plus 24 volts during full power operation of the system and, otherwise during standby operation of the system, plus 5 volts. The system is fully powered only at times when data is desired to be recorded. During the remainder of the time the system is placed in the standby mode which conserves power.

The activation of the system is accomplished through remote signals which are received within the system by a latched relay. When a remote signal is received the latched relay will either activate the system from standby to ON condition or will deactivate the system from ON back to a standby condition. Such remote signals may be originated from within the submerged hull, e.g. from within a submarine.

OBJECTS OF THE INVENTION

An object of the invention is to provide a system capable of gathering and recording electronic data while contained in a housing which is removably attached to the hull of a submarine without requiring penetration through the hull.

Another object is to provide capability for oceanographic and acoustic measurements from sensors attached externally to a submarine during operation without interfering with the submarine operation in any way.

Still another purpose of the invention is to provide a system for gathering and recording data which is externally attached to the hull of a submarine and which can be quickly removed or disconnected from the hull of the submarine.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
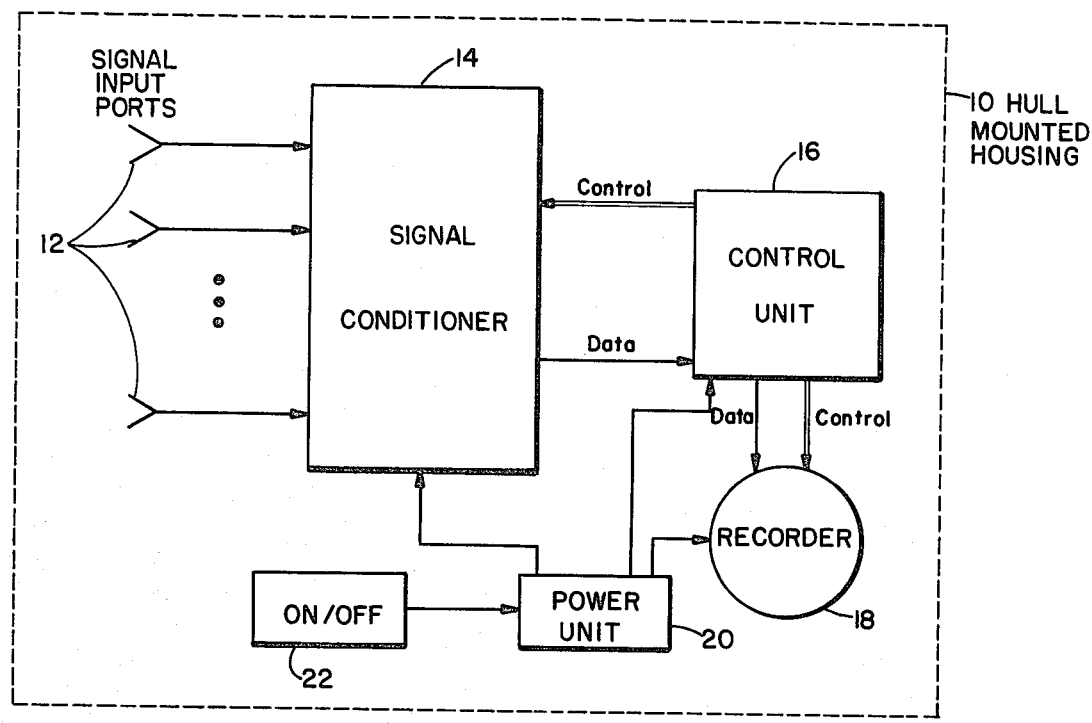
FIG. 1 is a block diagram schematic of the components of the data recording unit for a broad embodiment of the invention.

FIG. 1 shows a block diagram of a basic structure for the data recording system. The system is composed of the oceanographic data sensor input ports 12, a signal conditioner 14, a control unit 16, a recorder 18, a power unit 20, and an ON/OFF activation switch 22. In addition, the housing containing the components of the data recording system which is mounted on the surface of the submarine hull is depicted as item 10.

Oceanographic sensors mounted upon the hull of the submarine feed analog ac or dc signals through signal input ports 12 in the housing 10. These input ports are sealed against the housing to repel intrusion of seawater and to withstand hydrostatic pressure up to 1620 psi. The signal input ports are connected to signal conditioner 14 which is capable of providing analog frequency to count conversion for such sensors as conductivity meters and is also capable of providing analog-to-digital conversion for other sensors. The signal conditioner is under the control of control unit 16 and serially feeds its data through control unit to recorder 18. The recorder, also under control of the control unit, operates to receive and record data during periods of time defined by the control unit. Such periods of time for recording are generally much shorter than the normal time to accumulate data through the signal conditioner thereby providing opportunity to conserve energy in the system.

Power for this system is provided through power unit 20. Power unit 20 feeds power to the recorder, the control unit, and the signal conditioner. The source of power within the unit can be batteries.

The control to turn ON or OFF the power unit is the ON/OFF switch 22. This switch is activated by a remote signal which may be originated from within the hull of the submarine.

Figure 2:
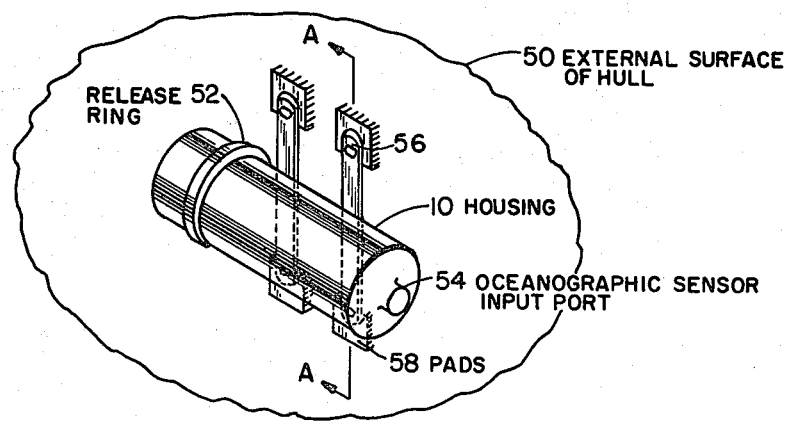
FIG. 2 shows the relation of the housing attached to the surface of a submerged hull.

FIG. 2 shows housing 10 attached to an external surface of a submerged hull 50. The housing is shown as a cylinder with both ends capped. A cylindrical cavity within the cylinder houses the electronics and other components of the data recording system. A port 54 is provided in one end of the cylinder for passing cables from the oceanographic data sensors to the signal input ports. An alternative would be to mount the signal input ports into receptive fittings on this port for receiving through proper plugs the output from the cables of the oceanographic data sensors.

The housing must be provided with an access port to facilitate the installation or removal of recording tapes, batteries, or circuit components within the cavity of the cylinder. As shown in FIG. 2, access means for the cylinder is accomplished by having the cylinder separable into two parts which are joined together and sealed with an annular bracket release ring 52 type fitting.

The cylinder is fitted with brackets 56 for attaching the cylinder in a removable way to the surface of the hull. As shown, the brackets will be fastened to pads 58 welded to the hull.

Figure 3:
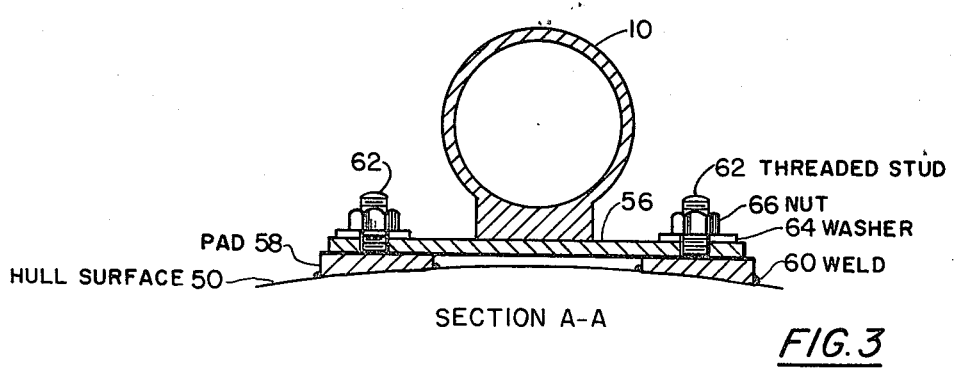
FIG. 3 is a cross section showing details of the attachment of the housing to the surface of the hull.

FIG. 3 is a cross section taken through one bracket 56 showing a method of connecting the housing to the surface of the hull. In FIG. 3, pads 58 are welded to the surface of the hull. Threaded studs 62 are fastened to the pad for receiving brackets 56 of the housing. The housing is fastened to the hull through the use of washer 64 and nut 66 fastened to the threaded studs 62 thereby holding down brackets 56. This method requires no penetrations to be made in the hull of a submarine. Clearly, other means of attaching the housing to the submarine hull without penetrating the hull are obvious.

Figure 4:
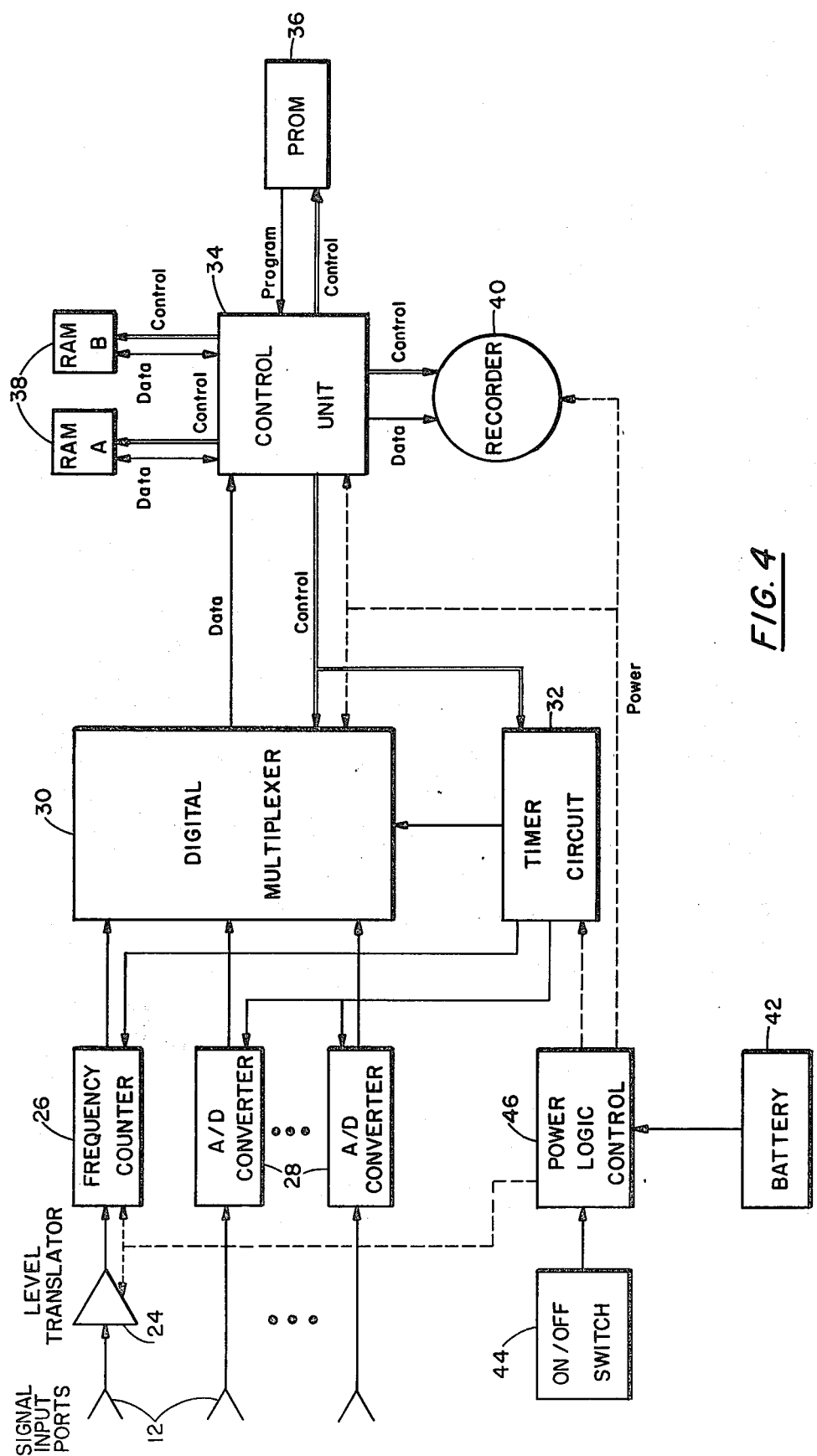
FIG. 4 is a block diagram schematic for a specific embodiment of the invention.

FIG. 4 shows a block diagram of a particular embodiment of the data recording system to be contained within the hull mounted housing. The system includes several signal input ports 12, a level translator 24, a frequency counter 26, several analog-to-digital converters 28, a digital multiplexer 30, a timing circuit 32, a control unit 34, a PROM 36, two RAMs 38, a recorder 40, a battery 42, an ON/OFF remote actuated switch 44, and a power logic control 46.

At least one signal input port is to be capable of handling frequency measurement such as that coming from a conductivity meter. In such measurement, the level translator converts analog frequency signals into binary coded decimal digital signals which are then counted by frequency counter 26. Other sensors which feed analog electric signals through the signal input ports have the signals converted to digital form through analog-to-digital converters 28. Digital multiplexer 30 combines the data signals and serially transmits them to the control unit.

Timing circuit 32 provides timing signals to the analog-to-digital converters, the frequency counter, and the digital multiplexer. A time record data sample may be injected into the data stream via the timing circuit and the digital multiplexer. Such data could include the year, month, date, hour, minute and seconds, including fractions thereof, and would be recorded on the magnetic tape along with the recorded data stream.

Control unit 34 receives the data from the digital multiplexer and transmits it to one of two RAMs 38. These RAMs serve as data buffers and are under control of the control unit. Data will be sent and stored in one buffer and held while data from the second buffer is being transmitted to the recorder for recording. Upon completion of recording from the second buffer the process may be reversed such that the second buffer will receive and store the data while the first buffer is emptied of its data onto the recorder 40.

Program control steps for the control unit are stored in PROM 36. Control functions of the control unit govern operation of the digital multiplexer, data buffers 38, the PROM, the timing circuit, and the recorder.

The recorder 40 is a cassette tape recorder. For this embodiment, cassette tapes of 300 foot lengths are used. When the tape has been filled with data, it may be removed from the housing through the access port and a fresh tape installed in its place for a second session of running.

Power to the system is provided through power logic control 46 which shifts power voltages at preselected levels to the various components of the system. Power is provided by battery assemblies in the battery unit 42.

ON/OFF switch 44 is a remote controlled latch type switch that may be activated by a signal originating from within the hull of the submarine. When activated, ON/OFF switch 44 will trigger a solid state opto-isolated switch contained in the power logic control which switches the voltage level of the battery to the full operation mode of plus 24 volts in this embodiment. When the ON/OFF switch is OFF the power logic control maintains the system in a standby condition wherein a voltage of plus 5 volts is supplied to the components of the system. The system may be turned ON or OFF, i.e. to the standby position, at any time by the remote signal.

When the system is turned ON, the processor starts up and the data shuffling and recording ensues. Sometime latter, when an OFF command appears, the processor waits until an end of file occurs and then turns itself OFF. The system reverts to the standby mode and waits for the next ON command.

Obviously many modifications and variations of the present invention are possible in the light of the above teachings. It is therefore to be understood that within the scope of the appended claims the invention may be practiced otherwise than as specifically described.

What is claimed is:

1. An apparatus for remote oceanographic data recording being self-contained and battery operated comprising:
   a plurality of means for receiving data signals from oceanographic data sensors;
   means connected to the output of the receiving means for conditioning the data signals to be recorded;
   means for recording the conditioned data signals;
   means connected to the conditioning means and the recording means for controlling their operation and handling the transfer of data signals to the recording means in a predetermined manner;
   means connected to the receiving means, the conditioning means, the recording means, and the controlling means for energizing them; and
   means disposed to receive a remotely originated signal for activating the energizing means and the control means.

2. An apparatus according to claim 1 wherein the activating means includes:
   a latched relay.

3. An apparatus according to claim 2 wherein the energizing means comprises:
   a plurality of batteries and a power logic control unit connected to the latched relay and which is switchable between a STANDBY mode and an ON mode by the latched relay.

4. An apparatus according to claim 3 wherein the power logic control unit comprises:
   a voltage reducer which sets the voltage level at a predetermined voltage to be supplied from the power logic control unit output during the STANDBY mode; and
   an opto-isolated switch which, when activated to the ON mode by the latched relay, causes a preset full power voltage to be supplied from the output of the power logic control unit.

5. An apparatus according to claim 4 wherein the recording means includes:
   a magnetic tape recorder.

6. An apparatus according to claim 5 wherein the controlling means includes:
   a microprocessor.

7. An apparatus according to claim 6 wherein the data signal includes analog electrical input signals, said conditioning means comprising:
   means connected to one of the receiving means for converting the electrical data signal from frequency to a binary digital format;
   a counter connected to receive the binary digital output of the converting means for accumulating count of the frequency cycles;
   a plurality of analog-to-digital converters connected to the remaining receiving means to receive and convert analog electrical data signals to a digital format; and
   a digital multiplexer receiving the digital signals from the counter and the analog-to-digital converters, and combining them for transmission through a multiplexer output, the control of which occurs from command signals received from the microprocessor.

8. An apparatus according to claim 7 further including:
   a timing circuit which receives power from the output of the power logic circuit and command signals from the microprocessor control unit, emits preset timing frequency signals to the analog-to-digital converters, the frequency counter, and the multiplexer, and emits a time signal to be recorded on the magnetic tape recorder.

9. An apparatus according to claim 8 further including:
   a first and second RAM connected to receive command signals from the microprocessor control unit, and to receive from, store and send to the microprocessor control unit data signals when commanded by the control unit.

10. An apparatus according to claim 9 further including:
    a PROM connected to receive command signals from the microprocessor control unit and to send program steps to the control unit.

11. An apparatus according to claim 10 further including:
    means for housing in a watertight manner the receiving means, the conditioning means, the recording means, the controlling means, the energizing means, and the activating means, said housing means being provided elements by which it is removably attachable to an external surface of a submerged hull without making penetrations of the hull.

12. An apparatus according to claim 11 wherein the housing means comprises:
    a cylinder capped at both ends with an inner cavity for housing in a watertight manner the receiving means, the conditioning means, the recording means, the controlling means, the energizing means, and the activating means, said cylinder and capped ends to be resistant to external hydrostatic pressures;
    a port in the cylinder for sealably passing cables to oceanographic data sensors;
    means built into the housing for accessing the inner cavity to facilitate the installation or removal of recording tapes, batteries, or circuit components, said accessing means to be watertight sealable when under a hydrostatic pressure; and
    brackets fixed to the outside of the cylinder as elements for removably attaching the housing means to the surface of the submerged hull.

13. An apparatus according to claim 12 wherein:
    the brackets fixed to the housing means are constructed so as to be fastenable with washers and nuts to threaded studs fixed to metal pads which are welded to the surface of the submerged hull.

14. A self-contained and battery-operated apparatus attached to the hull of a submersible vehicle for remote oceanographic data recording, said apparatus comprising:
    a plurality of means for receiving data signals from oceanographic data sensors;
    means connected to one of the receiving means for converting the electrical data signal from frequency to a binary digital format;
    a counter connected to receive the binary digital output of the converting means for accumulating count of the frequency cycles;
    a plurality of analog-to-digital converters connected to the remaining receiving means to receive and convert analog electrical data signals to a digital format;

a digital multiplexer receiving the digital signals from the counter and the analog-to-digital converters, and combining them for transmission through the multiplexer output;

a microprocessor control unit connected to receive the output of the digital multiplexer, said microprocessor control unit serving as a controlling means and preprogrammed to control operations according to a predetermined plan;

a first and second RAM connected to receive command signals from the microprocessor control unit, and to receive from, store and send to the microprocessor control unit data signals when commanded by the control unit;

a PROM connected to receive command signals from the microprocessor control unit and to send program steps to the control unit;

means for recording data signals, said recording means connected to receive data signals through the microprocessor control unit and under the control of said microprocessor control unit;

a timing circuit connected to receive command signals from the microprocessor control unit, said timing circuit connected to emit preset timing frequency signals to the analog-to-digital converters, the frequency counter, and the multiplexer, and to emit a time signal to be recorded on the recording means;

a power logic control unit connected to the receiving means, the frequency counter, the analog-to-digital converters, the digital multiplexer, the microprocessor control unit, the timer circuit, and the recording means, said power logic control unit providing means for energizing said components;

one or more batteries connected to the power logic control unit;

a latched relay attached to the power logic control unit for receiving a remotely originated signal to activate the power logic control unit to feed power to the apparatus; and means for housing in a watertight manner the receiving means, the counter, the plurality of analog-to-digital converters, the digital multiplexer, the timing circuit, the first and second RAM, the microprocessor control unit, the PROM, the batteries, the power logic control unit, the recording means, and the latched relay, said housing means being provided elements by which it is removably attached to an external surface of a submerged hull without making penetrations of the hull.

15. An apparatus according to claim 14 wherein the power logic control unit comprises:

a voltage reducer which sets the voltage level at a predetermined voltage to be supplied from the power logic control unit output during the STANDBY mode; and an opto-isolated switch which, when activated to the ON mode by the latched relay, causes a preset full power voltage to be supplied from the output of the power logic control unit.

16. An apparatus according to claim 15 wherein the housing means comprises:

a cylinder capped at both ends with an inner cavity for housing in a watertight manner the receiving means, the counter, the plurality of analog-to-digital converters, the digital multiplexer, the timing circuit, the first and second RAM, the microprocessor control unit, the PROM, the batteries, the power logic control unit, the recording means, and the latched relay, said cylinder and capped ends to be resistant to external hydrostatic pressures;

a port in the cylinder for sealably passing cables to oceanographic data sensors;

means built into the housing for accessing the inner cavity to facilitate the installation or removal of recording tapes, batteries, or circuit components, said accessing means to be watertight sealable under a hydrostatic pressure; and brackets fixed to the outside of the cylinder as elements for removably attaching the housing means to the surface of the submerged hull.

17. An apparatus according to claim 16 wherein:

the brackets fixed to the housing means are constructed so as to be fastenable with washers and nuts to threaded studs fixed to metal pads which are welded to the surface of the submerged hull.

* * * * *